(No Model.)
C. MacTAGGART.
GIRDER CLAMP AND HANGER.
No. 507,743. Patented Oct. 31, 1893.
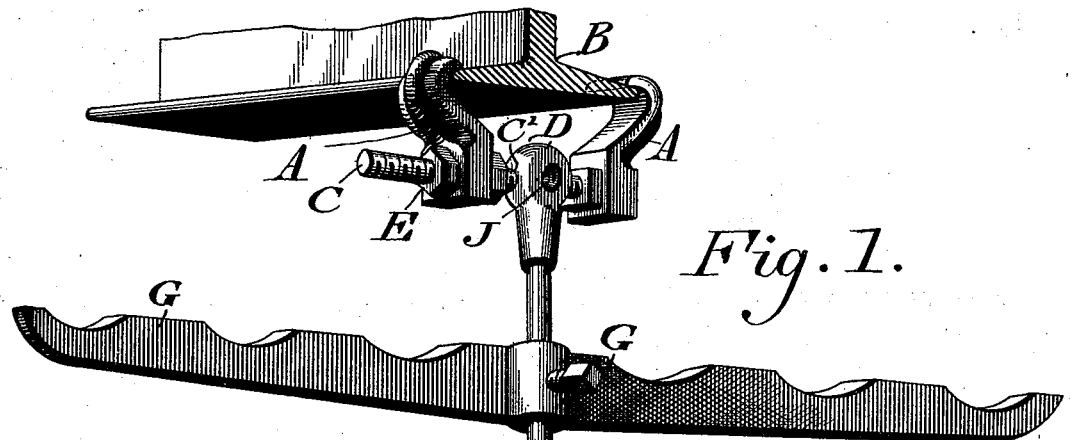
Fig. 1.
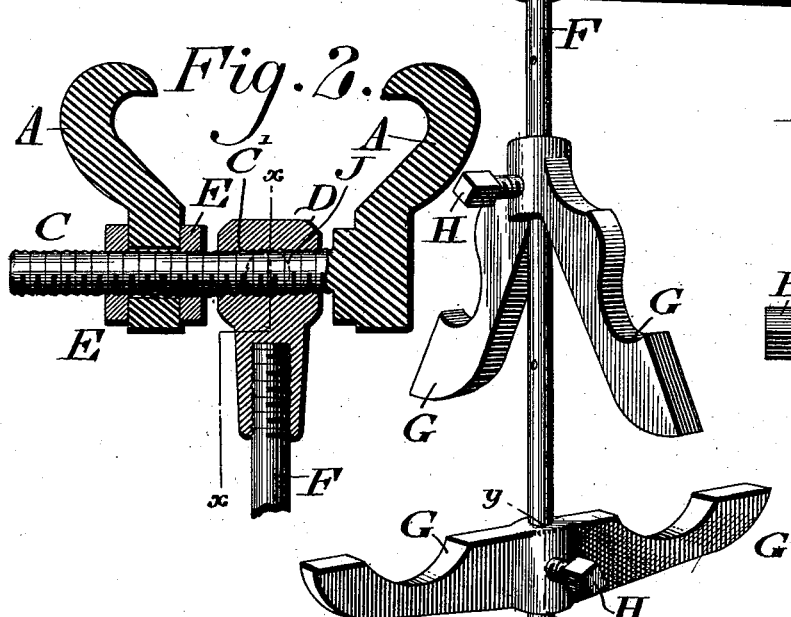
Fig. 2.
Fig. 4.
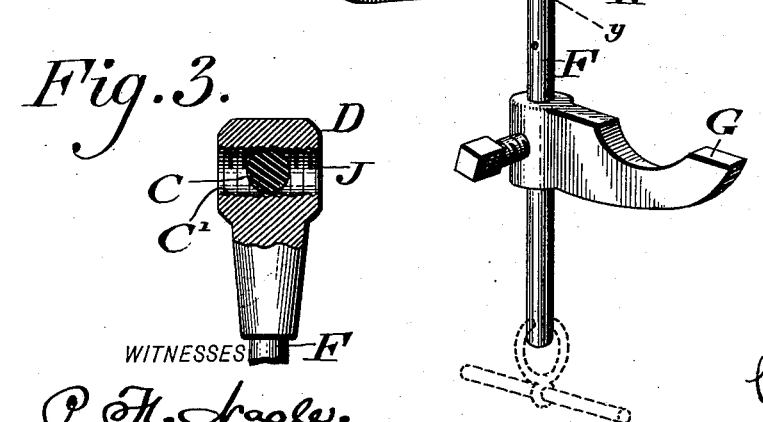
Fig. 3.
WITNESSES
P. H. Nagle
L. Douville
INVENTOR
Charles MacTaggart
BY
ATTORNEY.

UNITED STATES PATENT OFFICE.

CHARLES MacTAGGART, OF PHILADELPHIA, PENNSYLVANIA.

GIRDER CLAMP AND HANGER.

SPECIFICATION forming part of Letters Patent No. 507,743, dated October 31, 1893.

Application filed May 23, 1893. Serial No. 475,261. (No model.)

*To all whom it may concern:*

Be it known that I, CHARLES MACTAGGART, a citizen of the United States, residing in the city and county of Philadelphia, State of Pennsylvania, have invented a new and useful Improvement in Girder Clamps and Hangers, which improvement is fully set forth in the following specification and accompanying drawings.

My invention consists of a clamp adapted to be connected with a girder, and provided with means substantially as described for supporting water, gas, or other pipes, electric conductors, wires, &c.

Figure 1 represents a perspective view of a girder clamp and hanger embodying my invention. Fig. 2 represents a vertical section of the clamp on an enlarged scale. Fig. 3 represents a section of a portion on line $x, x$, Fig. 2. Fig. 4 represents a section of a portion on line $y, y$, Fig. 1, on an enlarged scale.

Similar letters of reference indicate corresponding parts in the several figures.

Referring to the drawings: A designates clamps or jaws adapted to embrace the flange of the girder or beam B. Connected with the lower end of one of the clamps is a bolt C, which passes through a threaded opening C' in the head D, and engages with the same, said bolt also passing freely through the other clamp, where it is provided with nuts E, which are adapted to jam or tighten against opposite sides of said clamp, so that the clamp may be adjusted relatively to the width of the girder or beam, and firmly secured thereto.

Depending from the head D, is a rod F, on which are supported the arms G, on which may be placed or seated water, gas or other pipes, electric conductors, wires, &c., said arms being vertically adjustable on said rod, and having bolts H, which may be tightened thereon, thus retaining the arms in adjusted position.

In the head D is an opening J, which extends at a right angle to the opening C', and may have the bolt C passed through, when such change of direction is required. The cross bar suspended from the lower end of the rod by means of a ring shown in dotted lines Fig. 1, may be used to support other pipes, wires, &c., when so desired.

Having thus described my invention, what I claim as new, and desire to secure by Letters Patent, is—

1. Girder clamps in combination with a bolt connecting the same, and the head of a supporting device depending from said bolt, said head having openings at an angle to each other for the passage of said bolt, substantially as described.

2. Girder clamps having a bolt and nuts adjustably connecting the same, a head on said bolt, a rod depending from said head, and an arm connected with said rod, said head having openings at an angle to each other for the passage of said bolt, the parts named being combined substantially as described.

CHARLES MacTAGGART.

Witnesses:
JOHN A. WIEDERSHEIM,
A. P. JENNINGS.